(12) United States Patent
Fruehling et al.

(10) Patent No.: US 10,764,256 B2
(45) Date of Patent: Sep. 1, 2020

(54) SMART PHONE, VEHICLE CONTROL SYSTEM HAVING SMART PHONE, AND CONTROL METHOD

(71) Applicant: Hella KGaA Hueck & Co., Lippstadt (DE)

(72) Inventors: Dietmar Fruehling, Wiesmor (DE); Jörg Tovar, Varel (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 426 days.

(21) Appl. No.: 15/302,080

(22) PCT Filed: Apr. 1, 2015

(86) PCT No.: PCT/IB2015/000861
§ 371 (c)(1),
(2) Date: Oct. 5, 2016

(87) PCT Pub. No.: WO2015/155604
PCT Pub. Date: Oct. 15, 2015

(65) Prior Publication Data
US 2017/0118178 A1    Apr. 27, 2017

(30) Foreign Application Priority Data

Apr. 9, 2014  (CN) .......................... 2014 1 0140599

(51) Int. Cl.
*H04L 9/12*    (2006.01)
*B60R 25/24*   (2013.01)
(Continued)

(52) U.S. Cl.
CPC .......... *H04L 63/0428* (2013.01); *B60R 25/24* (2013.01); *G05D 1/0022* (2013.01); *H04B 5/0025* (2013.01); *H04B 5/0068* (2013.01); *H04L 9/3271* (2013.01); *H04L 63/0876* (2013.01); *H04M 1/026* (2013.01); *B60R 2325/205* (2013.01); *G07C 9/00309* (2013.01);
(Continued)

(58) Field of Classification Search
None
See application file for complete search history.

(56) References Cited

U.S. PATENT DOCUMENTS

2006/0232437 A1   10/2006   Gutowski
2007/0109101 A1    5/2007   Colby
(Continued)

OTHER PUBLICATIONS

Search report for corresponding PCT/IB2015/000861, dated Nov. 16, 2015 (7 pages).

(Continued)

*Primary Examiner* — John Olszewski
*Assistant Examiner* — Gerrad A Foster
(74) *Attorney, Agent, or Firm* — Abelman, Frayne & Schwab

(57) ABSTRACT

A smart phone comprises an NFC antenna and a signal-send unit that communicates with the NFC antenna. The smart phone further comprises an NFC tag containing identification information. The smart phone is configured so that the signal-send unit transmits identification information to an ECU mounted within a vehicle, allowing remote control of the vehicle. The transmitted signals sent by the smart phone are encrypted by a third party.

16 Claims, 2 Drawing Sheets

(51) Int. Cl.
  *H04B 5/00*     (2006.01)
  *H04L 29/06*    (2006.01)
  *G05D 1/00*     (2006.01)
  *H04L 9/32*     (2006.01)
  *H04M 1/02*     (2006.01)
  *G07C 9/00*     (2020.01)

(52) U.S. Cl.
  CPC ..... *H04L 2209/80* (2013.01); *H04M 2250/04* (2013.01)

(56) References Cited

U.S. PATENT DOCUMENTS

| | | | |
|---|---|---|---|
| 2007/0135112 A1* | 6/2007 | Lessing | G06Q 20/353 |
| | | | 455/418 |
| 2013/0068842 A1 | 3/2013 | Kuo | |
| 2013/0234827 A1* | 9/2013 | Tomita | G08C 23/04 |
| | | | 340/5.61 |
| 2014/0058586 A1* | 2/2014 | Kalhous | B60R 25/24 |
| | | | 701/2 |

OTHER PUBLICATIONS

Written opinion for corresponding PCT/IB2015/000861, dated Nov. 16, 2015 (13 pages).
Article 94(3) EPC communication for corresponding European application, 1573641314.4, dated Nov. 27, 2018 (6 pages).

\* cited by examiner

SMART PHONE, VEHICLE CONTROL SYSTEM HAVING SMART PHONE, AND CONTROL METHOD

CLAIM FOR PRIORITY

This application claims priority to PCT/IB2015/000861, filed 1 Apr. 2015, which claims benefit to Chinese Application No. 201410140599.9, filed on 9 Apr. 2014.

TECHNICAL FIELD

The invention relates to vehicle devices and control systems, in particular a smart phone, a vehicle control system having a smart phone, and a control method whereby secure communications between a smart phone and a vehicle control system are encrypted.

BACKGROUND

Among the methods of controlling vehicles, the remote access of a vehicle and starting of the vehicle motor is normally implemented by remote terminals with appropriate channels such as GROUPE SPÉCIALMOBILE (GSM), BLUETOOTH, wireless local area network (W-LAN) and Near Field Communication (NFC). Security concerns mandate an authorization process during the communication between the vehicle control system and the remote terminals. That means the vehicle control unit verifies the features of signals sent by vehicle control terminal to decide whether to follow the instructions. However, a wireless network of remote control terminals such as smart phones is typically unsecured, which can not satisfy the safety requirement.

Therefore, the signals are normally encrypted by the phone's subscriber identification module (SIM) card or by a separate security chip. The encryption method can conflict with the encryption method used for the SIM card by the communication carrier. For example, CHINA MOBILE COMMUNICATIONS CORPORATION (CMCC) manages the encryption method of SIM cards that it provides. When users want to use the SIM card to encrypt signal, they must contact the carriers to obtain the relevant code and encryption method. Further, a separate query is required for each phone, inconveniencing users. The same problem occurs when using a separate security chip. Users have to send queries to a third party manufacturer to encrypt signals. This process delays the ability of a smart phone to remotely access the user's vehicle.

Such an encryption method will also be unavailable when the smart phone battery becomes discharged. In such a case, a user will not be able to remotely access the vehicle.

Therefore, a new third party encryption structure is required to optimize the encryption method, and to be available even without battery power.

The present invention relates to a smart phone with a third party encryption structure and a vehicle control system having a smart phone. The present invention also relates to a control method whereby secure communications between a smart phone and a vehicle control system are encrypted.

SUMMARY

The present invention discloses a smart phone comprising a near-field communication (NFC) antenna and a signal-send unit that communicates with the NFC antenna. The smart phone further comprises an NFC tag which is assembled with the smart phone. The NFC tag contains identification information. The NFC tag communicates with the NFC antenna to send the identification information to the NFC antenna. The NFC antenna is configured to transfer the identification information to the signal-send unit so that the signal sent by the signal-send unit containing the identification information through long range communication method.

Preferably, the identification information comprises a unique identification number associated with the NFC tag, and comprises encryption information.

Preferably, the smart phone further comprises an encrypted data storage encrypting the encryption information by the Advanced Encryption Standard (AES).

Preferably, the NFC tag is positioned in one of several places including, but not limited to: attached by adhesive to the exterior of the smart phone; integrated within the housing of the smart phone; attached to or integrated within the battery of the smart phone; or attached to a detachable protective shell cover.

Preferably, the NFC tag is of a brittle design, so that if the NFC tag is removed from the smart phone, such as by an unauthorized person, the NFC tag breaks and cannot be reused.

Preferably, a switch is provided on the NFC tag to activate or deactivate the NFC tag.

Preferably, the NFC tag stores the International Mobile Station Equipment Identity (IMEI) number of the smart phone so that the NFC tag is activated only when paired with the smart phone bearing that IMEI.

Preferably, the vehicle engine control unit (ECU) communicates with the smart phone by GSM, BLUETOOTH, W-LAN, or NFC.

Preferably, the NFC tag comprises a mark of manufacture of the smart phone.

The present further discloses a control system with the smart phone, the control system comprising an ECU positioned in the vehicle; the ECU controlling the vehicle according to the received signal sent by the signal-send unit.

Preferably, the ECU comprises a transceiver module to communicate with the smart phone.

Preferably, the ECU sends a challenge to the smart phone; the NFC tag sends a response corresponding to the challenge to the signal-send unit; and the signal-send unit sends the response to the ECU to verify the identification information.

Preferably, the smart phone further comprises a signal receive unit for relaying the challenge to the NFC tag.

Preferably, the control system further comprises an NFC base positioned on the vehicle to communicate with the ECU so as to transfer the received signal to the ECU; the NFC tag communicates with the NFC base to send the signal to the NFC base.

Preferably, the NFC base is positioned in the vehicle door handle, the B-pillar or the windshield A-pillar.

Preferably, a low frequency (LF) radio interface is provided for the NFC tag to determine the position of the NFC corresponding to the vehicle.

Preferably, the LF radio interface is powered by the NFC antenna.

Preferably, the smart phone shows the condition of the vehicle according to the signal sent by the ECU.

Preferably, the ECU stores the identification information and encryption information of the NFC tag to identify the effective NFC tag.

The present invention also discloses a control method, comprising the following steps: the smart phone communicates with the NFC tag by NFC antenna to obtain the identification information; the NFC antenna transfers the identification information to the signal-send unit; and the signal-send unit communicates with the ECU to send a signal containing the identification information to the ECU.

Preferably, the control method comprises of the following steps: the ECU sends a challenge to the smart phone; the smart phone relays the challenge to the NFC tag; the NFC tag sends a response corresponding to the challenge to the smart phone; the smart phone relays the response to the ECU; and the ECU executes the operation when the response is verified.

Preferably, the control method comprises the following step: the smart phone sends an inquiry to the ECU.

Preferably, the NFC tag integrates the identification number of the NFC tag into the response.

After adopting the technical solutions, the NFC tag provides identification information to the smart phone, and the identification information is sent together with the control signals of the smart phone, which encrypt the control signals. A vehicle or other external device will verify the identification information. Since the identification information of NFC tag is stored in the NFC tag and the NFC antenna has obtained the identification information when communicating with NFC tag, a third party is unnecessary. Otherwise, when the battery of the smart phone runs out, a user can make the NFC tag communicate with the vehicles' NFC base directly to send control signals which assure that operation can be done at any time.

BRIEF DESCRIPTION OF THE DRAWINGS

The invention is described in greater detail below by reference to preferred embodiments which are illustrated in the attached drawings in which.

DETAILED DESCRIPTION

Figure 1:
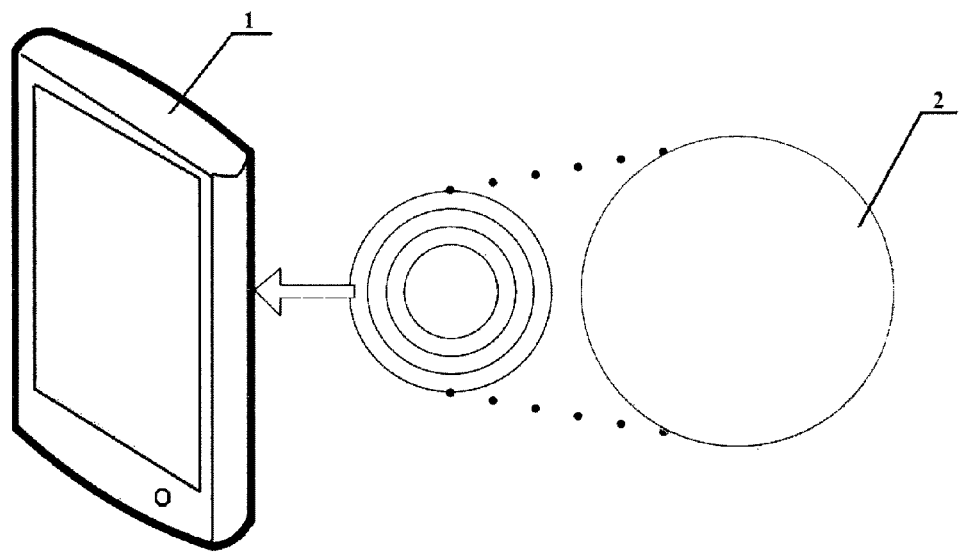
FIG. 1 shows a schematic diagram of the structure of smart phones with NFC tag.

FIG. 1 shows a schematic diagram of the structure of a smart phone 1 with an NFC tag 2. The smart phone 1 in the present invention includes an NFC antenna (not shown) and a signal-send unit (not shown). The NFC antenna here refers to an antenna or base which allows smart phone 1 to possess an NFC function. It is increasingly more common for today's smart phones to be provided with an NFC antenna, which is arranged on the shell of the smart phone 1 or assembled with the smart phone's battery. The signal-send unit is a communication module that communicates with external devices through a long range communication method such as GSM transmission, BLUETOOTH transmission, W-LAN transmission or NFC. The signal-send unit is typically arranged inside smart phone 1. The NFC antenna communicates with the signal-send unit and the signal-send unit sends the information received from NFC antenna to external devices (see vehicle 3 in FIGS. 2-4). In the present invention, the smart phone 1 further comprises an NFC tag 2 which is assembled with the smart phone 1, i.e. the NFC tag 2 is enclosed within the smart phone 1 or attached to the smart phone 1 by adhesive or other connectors to integrate the NFC tag 2 as a part of the smart phone 1. The NFC tag 2 stores identification information. Users (see user 7 in FIGS. 2-4) can place the smart phone 1 with the NFC tag 2 within close proximity of the NFC antenna so as to make NFC tag 2 and NFC antenna communicate with each other by NFC mode. The NFC antenna reads the identification information of the NFC tag 2 to complete the process of sending information from the NFC tag 2 to the NFC antenna. After receiving the identification information, the NFC antenna transfers it to the signal-send unit to make the signals sent by the signal-send unit possess the identification information. Hence, the identification information is regarded as the identification feature and encryption information of the signals sent by smart phone 1. The external devices receive and verify the signals to achieve the technical effect that signals sent by signal-send unit are encrypted.

The working principle of the NFC tag 2 in prior art is totally different from the present invention. In the prior art, an NFC tag 2 is arranged on the surface of a phone. When the NFC antenna of the smart phone 1 sweeps the NFC tag 2, the NFC tag 2 records the settings or applications of the smart phone 1. After that, when the smart phone 1 sweeps the NFC tag 2 again, the smart phone 1 applies the recorded settings. In contrast, in the present invention the NFC tag 2 serves as a media providing identification information, and is arranged inside the smart phone 1 so that users can make the NFC tag 2 portable.

The identification described herein comprises the identification number or encryption information of the NFC tag 2. That means, the NFC antenna can obtain the identification number and code directly from the NFC tag 2. The identification number of NFC tag 2 is stored in NFC tag 2 at the time of manufacture, similar to the media access control (MAC) address of a laptop. The ID is unique and easily verified. The code can be optionally set in the application of the smart phone 1. Only when users input the right code, will the smart phone 1 send control signals to vehicle 3. In particular, the encryption information can be codes encrypted by AES. When the smart phone 1 needs to exchange important data with external devices, the data can be encrypted by AES. An encrypted data storage is provided in the smart phone 1, which encrypts the data based on AES. It is known to people skilled in art that applications in a smart phone can replace the encrypted data storage to encrypt the data.

Optionally, the IMEI of the smart phone 1 can be stored in the NFC tag 2. The IMEI serves as the match standard with the NFC tag 2. When the identification of NFC tag 2 is verified, the IMEI will also be checked. In particular, the NFC tag 2 stores the IMEI. Only when the IMEI of a smart phone 1 matches the stored IMEI, will the NFC tag 2 be activated, improving security.

The NFC tag 2 can be arranged on the following positions in embodiments of present invention. The NFC tag 2 is pasted on the smart phone 1 or its shell and exposed outside so that users can replace it conveniently; the NFC tag 2 is assembled inside the shell of smart phone 1 such as being pasted on the inner surface of the shell during manufacture; the NFC tag 2 is arranged on the battery of smart phone 1 in closer proximity to the NFC antenna and to ensure that the smart phone 1 identifies the NFC tag 2; or the NFC tag 2 is assembled on an internal or exterior surface of a removable protection case.

In one embodiment, to prevent an unauthorized person from removing the NFC tag 2 from smart phone 1, a brittle type NFC tag is employed. When a brittle NFC tag is removed, it will break and will be rendered unusable.

Similarly, in order to improve security, a switch is provided on the NFC tag 2 to activate or inactivate the NFC tag 2. When the NFC tag 2 is not in use, the switch will deactivate the NFC tag 2, preventing other NFC antennas of other smart phones or other devices from reading the identification number of the NFC tag 2.

In another embodiment, the NFC tag 2 comprises the manufacturer tag. For example, when the NFC tag 2 is enclosed on the smart phone 1, the manufacturer such as IPHONE, SAMSUNG, NOKIA can be designed on the NFC tag 2 so that the overall structure of the smart phone 1 will not be affected.

The smart phone 1 of any one of the above embodiments apply the identification information of the NFC tag 2 to transmit signals. The NFC tag 2 is assembled with the smart phone 1. Users can switch on or switch off the NFC tag 2. There is no need to ask a third party for an identification code, allowing for a simpler design than the prior art.

Figure 2:
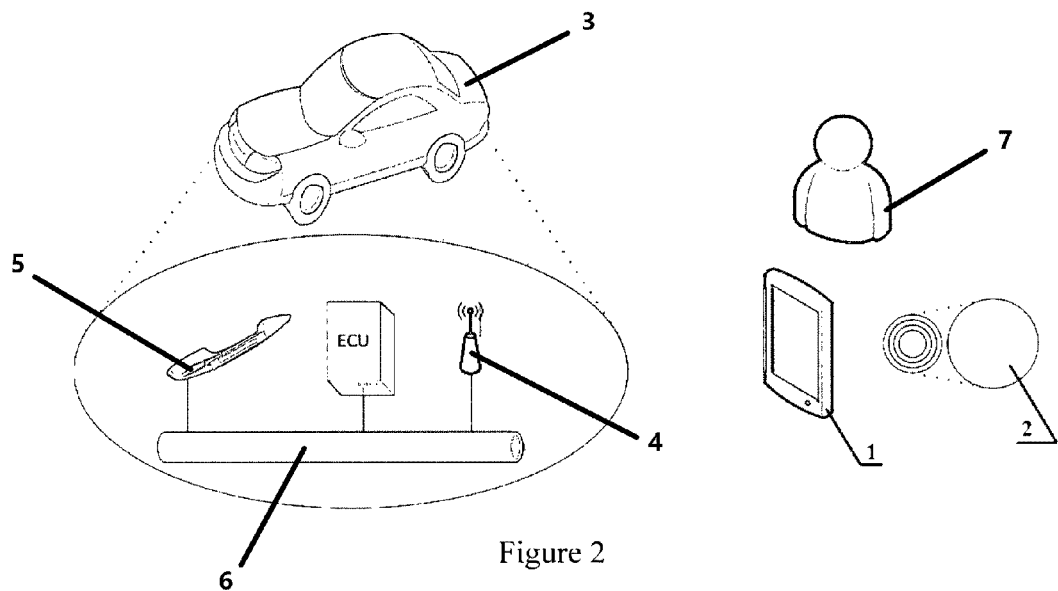
FIG. 2 shows a schematic diagram of the vehicle control system with the smart phone.
Figure 3:
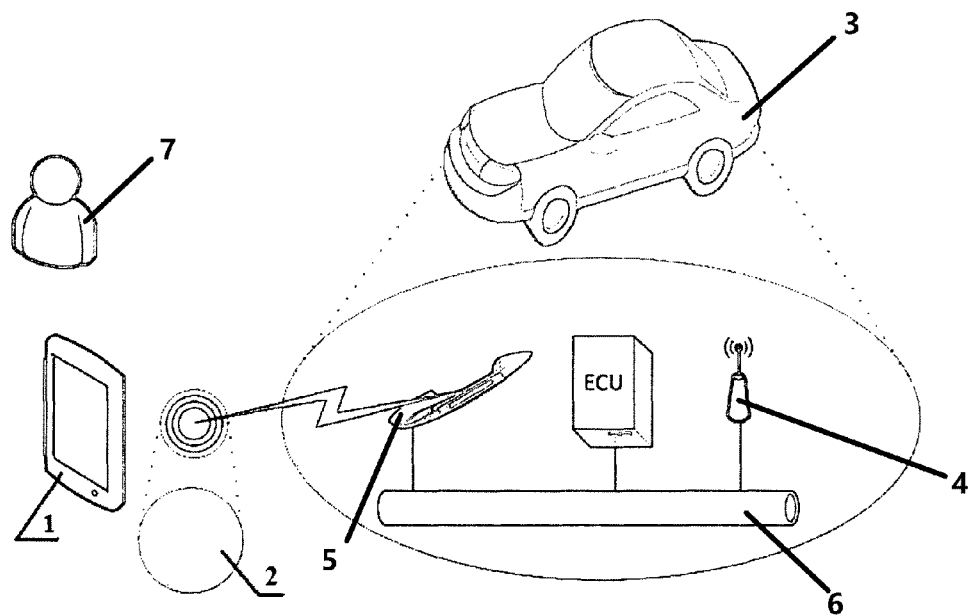
FIG. 3 shows a schematic diagram of the vehicle control system in one embodiment.

The present invention further discloses a vehicle control system with smart phone 1 described herein. FIG. 2 shows a system schematic diagram of the vehicle control system. The external device is a vehicle 3 in the above embodiments. In order to establish the communication between the vehicle 3 and smart phone 1, an ECU is provided with and positioned inside the vehicle 3. The ECU receives signals sent from smart phone 1 via an ECU antenna 4 (or via an NFC base 5 of the vehicle 3 as shown in FIG. 3 and described below in detail) and controls the vehicle 3 according to the instruction contained in the signals. In this embodiment, the communication between the smart phone 1 and the ECU is normally established by GSM, BLUETOOTH, W-LAN, etc.

In one embodiment, the ECU comprises a receive-send module (not shown) for receiving signals sent from smart phone 1 and sending signals to the smart phone 1 (if necessary). As the smart phone 1 possesses an NFC tag 2, the signals sent from the smart phone 1 will include the identification information of the NFC tag 2. The receive-send module of the ECU stores the identification information of a correctly connected NFC tag 2 to verify whether the ECU is connected with the right smart phone, so that the communication between the ECU and smart phone 1 is a closed network and the external device is inaccessible to the network. The technical effect is quite important in control system. If the communication between the vehicle 3 and the external control terminal (smart phone 1) were an open network, that would mean that all control terminals connected with the ECU could send instructions such as opening switches, closing switches, and starting the engine, which would be unsafe for users. Therefore it is necessary for the control system described herein to encrypt the signals to assure that only the right user can use the right control terminal to control the right vehicle.

In order to assist the ECU to verify whether signals sent from smart phone 1 with identification information of NFC tag 2 is identical with the right identification information, the ECU challenges the smart phone 1 after receiving the signals. The challenges in the present invention refer to the ECU sending a confirmation to the smart phone 1 to confirm whether the smart phone 1 is a correct terminal after receiving the signals and identification information. The challenge will be described in detail below. Based on the challenge, the NFC tag 2 will send a response to the signal-send unit of the ECU. The signal-send unit will transfer the response to the ECU to verify the identification information.

In one preferable embodiment, a signal-receive unit is provided in the smart phone 1 for relaying the challenge. In particular, when the ECU challenges the signal-receive unit, the signal-receive unit relays the challenge to the NFC tag 2. Based on the challenge, the NFC tag 2 sends a response to the signal-send unit. The response corresponds to the challenge to allow the ECU to verify whether the identification information is correct. In one embodiment, the signal-receive unit and signal-send unit can be assembled as a module. The process of signal sending and signal receiving is isolated so that sending the challenge, receiving the challenge and verifying the identification information occupies a short period which will not delay the control.

Figure 4:
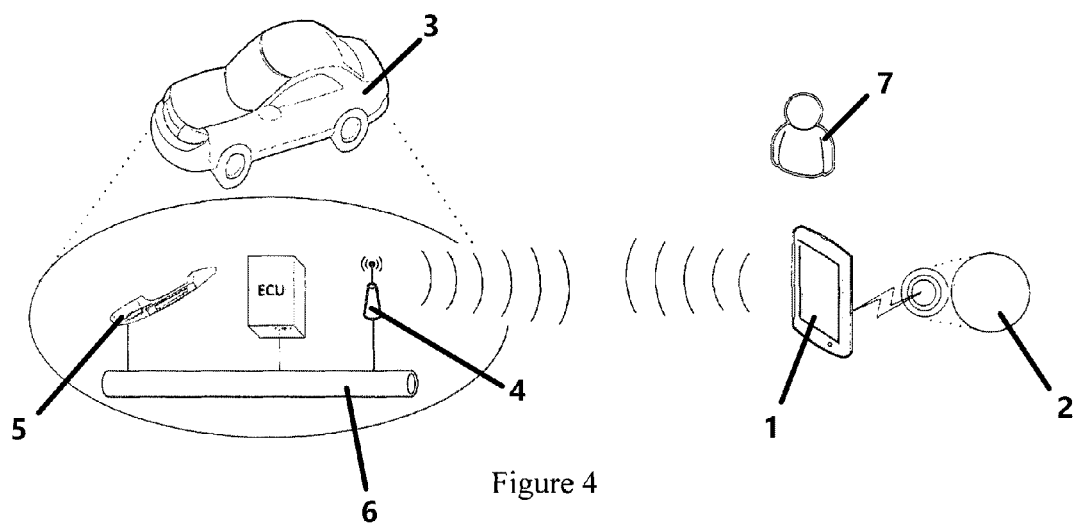
FIG. 4 shows an operative diagram of the vehicle control system.

As shown in FIGS. 2-4, an NFC base 5 positioned on the vehicle 3 is also provided in the vehicle control system. As mentioned before, when the battery of the smart phone 1 runs out, the user cannot use the smart phone 1 to send a control signal. In such a case, the NFC base 5 mounted on the vehicle 3 can communicate with the smart phone 1 directly through NFC tag 2 (see FIG. 3), which as described is provided with the smart phone 1. In one preferable embodiment, the NFC base 5 is arranged in the door handle, the B column or the windshield A column of the vehicle 3, allowing a user to bring the NFC tag 2 within close proximity (but without contact) with the NFC base 5. After the communication between NFC tag 2 and NFC base 5 is established, signals with identification information sent from the NFC tag 2 will be transferred to the NFC base 5. In one example, when the user brings the smart phone 1 with NFC tag 2 toward the door handle of a vehicle 3 on which the NFC base 5 has been installed (see FIG. 3), the NFC base 5 verifies that the smart phone 1 with NFC tag 2 is approaching and activates its NFC communication. The NFC tag 2 sends its identification information to the NFC base 5 through the NFC communication protocol. The NFC base 5 receives and verifies the identification information. If the identification number of the NFC tag 2 matches the identification information that has been stored in the NFC base 5, the NFC base 5 will send the identification information a query about opening a switch to the ECU via a Controller Area Network bus (CAN-BUS) 6. The ECU confirms the identification number and query valid, commands the opening of the switch, and produces a confirmation for the user, such as via an LED or scintillator emits light.

In the embodiment above (FIG. 3), when the ECU receives the identification number and query, it can also challenge to assure that the received control signals are sent by the right NFC tag 2. In particular, the NFC base 5 receives the identification number and query through CAN-BUS 6 and sends the identification number and query to the NFC tag 2. The NFC tag 2 forms a response and sends the response to the NFC base 5 via NFC communications protocol. The NFC base 5 receives the response and sends the identification number and response to the ECU through the CAN-BUS 6 for verifying.

Based on the embodiment above, when the battery of the smart phone 1 discharges, the user 7 can still open a switch or close a switch with smart phone 1 with NFC tag 2. Compared with prior art, the operation can be done at any time. As is known, every time an NFC tag is brought in close proximity to an NFC base 5 to establish communication with it, the NFC base 5 will automatically provide the NFC tag with electrical power through electromagnetic means. There is no need for a user to worry about NFC tag 2 being rendered useless by the discharge of the battery of smart phone 1.

In another embodiment, an LF radio interface is provided in the NFC tag 2. The LF radio interface is powered by the NFC antenna or by the smart phone 1 directly. The LF radio interface is used like radio code which can locate the smart phone 1 with the NFC tag 2 so that the user 7 can learn:

1. whether the NFC tag 2 or the smart phone 1 is located inside the vehicle 3 or outside the vehicle 3;
2. the distance between the vehicle 3 and the NFC tag 2 or the smart phone 1; and
3. the location within the vehicle 3 of the NFC tag 2 or the smart phone 1.

That means the user 7 can learn or even confirm the position of the NFC tag 2 relative to the vehicle 3 by the LF radio interface of the NFC tag 2. The LF radio interface is powered by external battery or charged by a rechargeable battery. The rechargeable battery is charged by the NFC antenna regularly or powered by the NFC antenna directly. Therefore, the smart phone 1 with the NFC tag 2 can implement passive entry or passive run. The function of the radio code can be implemented by the NFC tag 2 with the LF radio interface.

With the development of applications in smart phones, a user can install an application to have a communication sent from the ECU to the application confirming the vehicle status. The information can also be displayed on the smart phone 1. Therefore, users can not only control the vehicle 3 but also know about the latest status of the vehicle 3.

The challenge and response process described before can be replaced by another arrangement to ensure that the ECU communicates with the right smart phone 1. In particular, the first time (or an indicated time) the right NFC tag 2 communicates with the ECU via the ECU antenna 4 by the smart phone 1, the ECU stores the identification information and encrypted code of the NFC tag 2 (see FIG. 4). When the smart phone 1 communicates with the ECU again, the ECU will check the received identification information and encrypted code with the stored identification information and encrypted code. Only when the result of check is identical, will the ECU control the vehicle 3 according to the signals. Compared with the challenge and response process, the whole process is handled in the ECU which saves time and enhances secure communication between the vehicle 3 and the smart phone 1.

FIG. 4 shows an operative diagram of the vehicle control system. The control method of the control system comprises following steps:

The smart phone 1 communicates with the attached NFC tag 2 by the NFC antenna of the smart phone 1 to get the identification information of the NFC tag 2;

The NFC antenna transfers the received identification information to the signal-send unit of the ECU via the ECU antenna 4 so that the signals sent from the signal-send unit contain the identification information.

The signal-send unit communicates with the ECU to send the signals with identification information to the ECU.

The control method above is a simple process whereby the smart phone 1 encrypts the signals by the NFC antenna and the NFC tag 2. Signals that the ECU receives contain the identification information that was added by the NFC tag 2.

In another embodiment, the control method comprises following steps: the ECU challenges the smart phone 1 after receiving the signals for verifying whether the identification information is correct; the smart phone 1 relays the challenge to NFC tag 2; the NFC tag 2 sends a response information to the smart phone 1 according to the challenge; the smart phone 1 relays the response information to the ECU via the ECU antenna 4; and the ECU verifies the response information and operates according to the instructions if the response information is correct.

As described herein, the operation of the smart phone 1 can be built based on the application of the smart phone 1. The user 7 can send a query to the ECU by an application before the above steps are operated to explain the identification number of the NFC tag 2 and request that the ECU open a switch. The ECU compares the received identification number with the identification number stored in memory. Only when the identification numbers match will the ECU issue a challenge to the smart phone 1. That means users can manually start the process of challenge and response.

As described herein, the response information can contain the identification number of the NFC tag 2 to help the ECU compare the received identification number with the identification number stored in memory.

The challenge and response process is described in detail below:

A. The user 7 requests opening the switches by the application. The process can be implemented by operate the application or its menu instructions;

B. The smart phone 1 sends a query through communication channels so that signals contain the identification number of the NFC tag 2 and the request;

C. The transceiver module of the vehicle 3 checks the query and identification number. If the identification number is correct, the query and identification number are sent to the ECU via the CAN-BUS 6;

D. The ECU receives the query and identification number to form a challenge. The challenge is sent to the transceiver module together with the identification number;

E. The transceiver module receives the challenge and identification number through CAN-BUS 6 and sends out through communication channels;

F. The smart phone 1 receives the challenge and identification number and defines the identification number as known;

G. The smart phone 1 communicates with the NFC tag 2 and send the challenge to the NFC tag 2;

H. The NFC tag 2 receives the challenge to form a response information and sends the response to the smart phone 1;

I. The smart phone 1 receives the response by NFC and sends the response together with the identification number through communication channels;

J. The transceiver module receives the response and identification number through communication channels and defines the identification number as known. After that, the identification number and response are sent to the ECU;

K. The ECU receives the identification number and response via the ECU antenna 4 and checks the identification number and response to define whether the identification number and response is valid. If the identification number and response are valid, the ECU opens the switch according to the instructions and sends a confirmation to the transceiver module by CAN-BUS 6;

L. The transceiver module receives the identification number and confirmation by CAN-BUS 6 and transfers them to the smart phone 1 through communication channels;

M. The smart phone 1 receives the identification number and confirmation and provides the user with a feedback (such as vibration, sound, signal light, or visual indication on the display of smart phone 1) showing that the switch is open.

Though the smart phone 1 is attached with an NFC tag 2, the communication between external NFC tag 2 and the smart phone 1 is normal and the NFC tag 2 will not communicate with another NFC base 5. In particular, if the NFC tag 2 is positioned in the reading zone of other NFC bases 5, the other NFC bases will identify whether the NFC tag 2 is an NFC tag 2 to be read. Similarly, the NFC antenna of the smart phone 1 will identify external NFC tag 2.

As described herein, a user can implement control on the smart phone 1 and establish communication between the smart phone 1 and vehicle 3, including via an application.

The invention claimed is:

1. A control system with a smart phone for a vehicle, the control system comprising an Engine Control Unit (ECU) positioned in the vehicle, and the smart phone comprising a Near Field Communication (NFC) antenna, an NFC tag, a signal-receive unit and a signal-send unit,
   - the NFC tag contains identification information comprising at least one of an identification number or encryption information;
   - the NFC tag is configured to communicate with the NFC antenna;
   - the NFC antenna is configured to communicate with the signal-receive unit and the signal-send unit; and
   - the control system is configured to execute a first series of steps: the ECU sends a challenge to the smart phone; the smart phone receives the signal via the signal-receive unit; the signal-receive unit relays the challenge to the NFC antenna; the NFC antenna relays the challenge to the NFC tag; the NFC tag sends a response corresponding to the challenge to the NFC antenna; the NFC antenna forwards the response to the signal-send unit; the signal-send unit forwards the response via the smart phone to the ECU, the ECU being configured to control the vehicle upon receiving the response to the challenge from the smart phone.

2. The control system according to claim 1, characterized in that,
   - the ECU comprises a transceiver module to communicate with the smart phone.

3. The control system according to claim 1, characterized in that,
   - the control system further comprises an NFC base positioned on the vehicle to communicate with the ECU, and
   - the control system is further configured to execute a second series of steps if the smart phone is inoperative and the control system is unable to execute the first series of steps, wherein the second series of steps comprises: the ECU sends a challenge to the NFC base; the NFC base relays the challenge to the NFC antenna; the NFC antenna relays the challenge to the NFC tag; the NFC tag sends a response corresponding to the challenge to the NFC antenna; the NFC antenna forwards the response to the NFC base; the NFC base forwards the response to the ECU, the ECU being configured to control the vehicle upon receiving the response to the challenge from the smart phone.

4. The control system according to claim 3, characterized in that,
   - the NFC base is positioned in a vehicle door handle, a B column or a windshield A column.

5. The control system according to claim 1, characterized in that,
   - a low frequency (LF) radio interface is provided on the NFC tag to determine a position of the NFC tag corresponding to the vehicle.

6. The control system according to claim 5, characterized in that,
   - the LF radio interface is powered by the NFC antenna.

7. The control system according to claim 1, characterized in that,
   - the ECU stores the identification information comprising at least one of an identification number or encryption information of the NFC tag,
   - such that the step of the ECU controlling the vehicle upon receiving the response to the challenge from the smart phone is only performed if the received response matches the stored identification.

8. The control system of claim 1, characterized in that,
   - the NFC tag integrates the identification information of the NFC tag into the response.

9. The control system according to claim 1, characterized in that,
   - the smart phone further comprises an encrypted data storage encrypting the encryption information by AES.

10. The control system according to claim 1, characterized in that,
    - the NFC tag is positioned in one of several places including: sticking onto the smart phone; integrated in the housing of the smart phone; on the battery of the smart phone; on a detachable protective shell cover.

11. The control system according to claim 1, characterized in that,
    - the NFC tag is of brittle manufacture such that removing the NFC tag from the smart phone will break the NFC tag and render it inoperative.

12. The control system according to claim 1, characterized in that, a switch is provided on the NFC tag to activate or deactivate the NFC tag.

13. The control system according to claim 1, characterized in that, the NFC tag stores the IMEI of the smart phone so that the NFC tag is activated only when the stored IMEI matches that of the smart phone incorporating the NFC tag.

14. The control system according to claim 1, characterized in that,
    - the ECU communicates with the smart phone by GSM, Bluetooth or W-LAN.

15. The control system according to claim 1, characterized in that,
    - the NFC tag comprises a mark of manufacture of the smart phone.

16. The control system according to claim 1, where the signal-receive unit and the signal-send unit are integrated into one device.

* * * * *